United States Patent [19]

Capdeville

[11] Patent Number: 5,252,231
[45] Date of Patent: Oct. 12, 1993

[54] PROCESS AND REACTOR FOR WATER TREATMENT USING A GRANULAR BED ADAPTED TO FLOAT DURING CLEANING

[75] Inventor: Bernard Capdeville, Toulouse, France

[73] Assignee: Institut National Des Sciences Appliquees De Toulouse, Toulouse, France

[21] Appl. No.: 812,119

[22] Filed: Dec. 23, 1991

[30] Foreign Application Priority Data

Dec. 21, 1990 [FR] France ............................. 90 16588

[51] Int. Cl.$^5$ .............................................. B01D 41/02
[52] U.S. Cl. ..................................... 210/794; 210/274; 210/277; 210/280; 210/290; 210/293; 210/797; 210/798
[58] Field of Search ............... 210/150, 151, 274, 277, 210/744, 792–796, 275, 797, 798, 807, 670, 673, 280, 290, 293

[56] References Cited

U.S. PATENT DOCUMENTS

| 2,376,912 | 5/1945 | Green | 210/795 |
|---|---|---|---|
| 3,260,366 | 7/1966 | Duff et al. | 210/795 |
| 3,631,983 | 1/1972 | Mail | 210/794 |
| 4,113,613 | 9/1978 | Sekoulov et al. | 210/794 |
| 4,118,320 | 10/1978 | Stuart | 210/274 |
| 4,693,831 | 9/1987 | Garzonetti | 210/795 |
| 4,719,020 | 1/1988 | Elmaleh | 210/807 |
| 4,976,873 | 12/1990 | Ross | 210/795 |

FOREIGN PATENT DOCUMENTS

| 0025309 | 3/1981 | European Pat. Off. | 210/794 |
|---|---|---|---|
| 0152711 | 8/1985 | European Pat. Off. | 210/792 |
| 3631817 | 5/1987 | Fed. Rep. of Germany | 210/793 |

Primary Examiner—Joseph W. Drodge
Attorney, Agent, or Firm—Harold H. Dutton, Jr.

[57] ABSTRACT

A process for the treatment of water using a granular bed (3) of granular support materials of a volumic mass less than that of the water to be treated. According to this process, each washing cycle comprises interrupting the withdrawal of treated water and stopping the feed of water to be treated in such a manner that the granular bed (3) floats in a given volume VL of water, admitting cleansing air into the reactor for assuring agitation of the floating bed, interrupting the admission of air in order to permit a separation of the granular materials and sediment by their difference in volumic mass, with decantation of said sediment and flotation of said materials, and evacuating the sediments at the base of the reactor as well as the water contained therein for evacuating the granular bed (3).

20 Claims, 2 Drawing Sheets

PROCESS AND REACTOR FOR WATER TREATMENT USING A GRANULAR BED ADAPTED TO FLOAT DURING CLEANING

This invention relates to a water treatment process and reactor using a granular bed adapted to assure a filtration of the water, or filtration with an associated biological purification of the water.

BACKGROUND AND OBJECTS OF THE INVENTION

There are many water treatment techniques using a granular bed adapted to assure either a conventional filtration of water or a filtration associated with a biological purification of used water, i.e. waste water. Because of the fact that there is produced over time a filling of the inter-granular spaces and therefore a clogging of the bed, each of these techniques consists in alternating water treatment cycles using the bed, and bed cleaning cycles for cleansing of the bed.

A first process thus consists during each treatment cycle, of causing the water to be treated to trickle through a completely emersed granular bed. This process however includes a major disadvantage resulting from the fact that the residence time of the water to be treated is relatively short, which leads to a mediocre effectiveness with respect to the elimination of soluble and particulate pollutants. On the other hand, the uncoupling of the biological film alters the quality of the treated effluent by the presence of materials in suspension.

To overcome this drawback, other processes have contemplated, during each treatment cycle, using a partially or completely submerged treatment bed comprised of granular support materials of a volumic mass greater than that of the water to be treated. These processes permit, in effect because of an increase in the residence time of the water to be treated, achieving a much more efficient biological purification than when the bed is completely emersed. Under these conditions, the retention of materials in suspension is favored but it leads to a clogging of the granular bed which is appropriate to control.

The cleaning cycles for the processes described above necessitate loosening or unpacking the granular bed by means of an air/water mixture in order to obtain a fluidization of this bed which is generally obtained by means of air, in order to conserve water, the water then being used for carrying off and recovering the sediment. The cleaning thus consists of loosening the granular bed by means of air, then evacuating the sediment by means of a continuous flow of water. The drawback of such a cleaning process resides in the fact that it requires a relatively significant water consumption which, in practice, turns out to correspond to a volume equal to several times the volume of the reactor, being able to represent up to 10% of the volume of water treated.

Another treatment technique has consisted in carrying out a filtration and a biological purification by means of a immersed floating granular bed, blocked on its upper portion by a grill, and comprised of support materials of a volumic mass much lower than that of the water, through which the water is caused to circulate in a rising or descending flow. According to this process, the cleaning of the granular bed is achieved according to the principle of a hydraulic flushing which permits an important saving of water with respect to the processes described above, while favoring an expansion of the support materials. However, such a cleaning often appears to be incapable of creating an adequate release of the sediment from the support materials, particularly during treatment of used water by a fixed culture, which frequently leads to an overall diminution of the effectiveness of the reactor.

The present invention seeks to overcome these aforementioned drawbacks of known processes, and has as its primary object to provide a process for the treatment of water in which the cleaning operations of the granular bed are optimized, that is requiring a very low volume of wash water, and leading to an effective unclogging of the granular bed, followed by a complete gravity separation of the sediment from the mixed liquor and the support materials thus permitting a complete evacuation of the sediment by a simple draining.

Another object of the invention is to provide a process permitting optimizing the retention of material in suspension and the oxidation of the soluble pollutants.

DESCRIPTION OF THE INVENTION

To this end, the invention provides a water treatment process of the type using a granular bed arranged in a reactor above a floor or platform, this granular bed being adapted to assure a filtration, or a filtration with an associated biological purification, of water and withdrawing the treated water from the bottom.

According to the invention, this process is characterized in that a granular bed is used which comprises granular support materials of a volumic mass lower than that of the water being treated, and in that each cleaning cycle comprises:

interrupting the withdrawal of treated water and stopping the feed of water to be treated in such a manner that the granular bed floats in a given volume VL of water, admitting cleaning air into the reactor in order to assure an agitation of the said floating bed, interrupting the admission of air in order to permit a separation of the granular materials and the sediment by the difference in the volumic mass, with decantation of the sediment and floatation of said materials, evacuating the sediments at the bottom of the reactor as well as the water contained therein in order to remove the sludge from the granular bed in preparation for a new treatment cycle.

Such a process thus comprises assuring during each cleaning cycle, a mixing in which the effectiveness is related particularly to the difference in the volumic mass between the support materials and the air/water mixture, which leads to localized shear forces which forces the release of the sediment. Moreover, the agitation is carried out in a given volume of water, which permits controlling said mixing by acting on the flow of air and its duration, without consuming water.

Further, the stopping of the agitation by interrupting the admission of air results in a very rapid separation of the granular materials and the sediments by their difference in volumic mass, with decantation of said sludge or sediment and flotation of said materials.

The liquid phase is thus found very highly enriched in sediments and comprises the mixed liquor to be evacuated, this evacuation being achieved by simple draining of the bed until completely empty.

The immediate consequences of these cleaning conditions are an economy of air and water and thus energy overall, a primary decanter surface, toward which the mixed liquor is evacuated, lower than for known processes where the bed is at least partially immersed, taking into account the lower quantity of cleaning water, and of cycle durations easily adapted to the characteristics of the water to be treated.

According to another characteristic of the invention, each treatment cycle is achieved in such a manner that the granular bed is immersed to a fraction less than the height Hi, and its upper portion emersed, with:

$$\frac{Hi}{H} \leq \frac{\rho mat}{\rho eau}$$

where:

H is the overall height of the granular bed, $\rho mat$ is the volumic mass of the support materials, $\rho eau$ is the volumic mass of the water to be treated.

The granular bed therefor comprises, in the first place, an emersed portion in which the water to be treated trickles through, which permits favoring the retention of materials in suspension in the interstices of the granular bed with respect to the elimination of the soluble materials, by reason of the low residence time of the water to be treated in this emersed portion.

The granular bed comprises in addition as immersed portion in which the residence time of the water to be treated is much greater, which permits favoring the elimination of soluble materials, while avoiding the inopportune salting out of materials in suspension.

For this reason, the level of immersion of the granular bed may be adjusted as a function of the content in the materials in suspension in the water to be treated while causing variation in the proportion the heights of the emersed portion in which is preferentially carried out the retention of the materials in suspension, and of the immersed portion in which is preferentially carried out the elimination of the dissolved materials and the adsorption of the colloidal materials.

The level of immersion may be adjusted by working on the volumic mass of the support materials comprising the granular bed. However, according to one preferred embodiment for carrying out this adjustment in a simple manner, during each treatment cycle, the granular bed is fed from above and the treated water is removed from below, in such a manner that the granular bed rests on the floor.

Under these conditions, one can in effect control the height of the immersed portion of the granular bed by acting on the height of the treated water outlet with respect to the floor, over a range of heights such that the weight of the granular bed remains greater than the corresponding Archimedean pressure.

Such a capacity of control permits easily optimizing the characteristics of the granular bed as a function of the content of the water to be treated, and especially the proportions of soluble materials. Further, the immersion level determined by this control of the height of the treated water outlet may also be adjusted while acting on the volumic mass of the support materials.

In addition, when the treatment cycle is carried out in such a manner that the granular bed rests on the platform, as described above, during each cleaning cycle, and in an advantageous manner:

the withdrawal of treated water is interrupted, the level of the water in the reactor is caused to rise in such a manner that the granular bed is made to float in the volume VL of water, and the feed of water to be treated is stopped.

Each cleaning cycle thus generates an increase in the Archimedes pressure with respect to the granular bed, in such a manner as to produce an equilibrium of these forces and cause a flotation of the bed.

It is also convenient to note that during the treatment cycles, and because of the fact of a rapid draining of the water to be treated in the emersed portion, the loss of weight establishes overall a better distribution over the height of the granular bed. These weight losses are thus lower than for a completely immersed bed, which permits increasing the duration of the treatment cycles and leads to an additional economy of cleaning water.

Further, according to another preferred embodiment permitting a determination of the volume VL of water providing the best compromise of agitation effectiveness/volume of air and minimum cleaning water, the withdrawal of treated water is interrupted and the feed of water to be treated is stopped in such a manner that, during the cleaning cycle, the granular bed floats in a volume of water VL, such that:

$$HL = \frac{H(1 - \epsilon)}{(1 - \epsilon')}$$

where: H is the total height of the granular bed at rest, $\epsilon$ is the porosity of the granular bed at rest, HL is the height of water in the reactor above the platform equivalent to the volume VL during agitation, and $\epsilon'$ is the porosity of the granular bed when it is agitated.

Further, the volume VL is preferably adapted in order that $$\frac{\epsilon'}{\epsilon} \geq 1.2.$$

In addition, during an aerobic treatment, during each cycle of treatment, air is preferably admitted into the treatment in the reactor, countercurrent to the flow of water to be treated.

According to two preferred embodiments, this treatment air may be delivered:

either at the base of the reactor, or above the floor, at an intermediate height above the lower platform at the immersion height of the granular bed.

According to another characteristic of the invention, a granular bed is used which comprises granular support material of a volumic mass $\rho$ such that $$0.7 \leq \frac{\rho_{mat}}{\rho_{eau}} < 1$$

where $\rho_{eau}$ represents the volumic mass of the water to be treated.

This granular bed may in addition be comprised of at least two superimposed layers of different granular supports, each of said materials having a volumic mass lower than that of the water to be treated. The materials of the different layers have, in addition, from the bottom to the top, a size and density increasing in such a manner as to favor the reclassification after washing.

According to another characteristic of the invention, a reactor is used in which the floor is a perforated platform able to sustain the granular materials and permit the passage of sediment, the platform being disposed at an intermediate height in the reactor.

The invention extends also to a water treatment reactor for carrying out the process described above, characterized in that it comprises in combination:

an enclosure provided in its upper portion with means for feeding the water to be treated, and comprising a platform in its lower portion, a porous bed comprised of granular support materials having a volumic mass lower than that of the water to be treated, the bed partially filling the enclosure to a height H, means for withdrawing the treated water from the bottom of the enclosure, closure means for the withdrawal means, means for feeding washing air for assuring the agitation of the granular bed, and means for evacuating the mixed liquor comprised of sediment suspended in the water.

DESCRIPTION OF THE DRAWINGS

Other characteristics, objects and advantages of the invention will become apparent from the detailed description which follows, with reference to the accompanying drawings which show by way of non-limiting example, a preferred embodiment of the invention. In these drawings which form an integral part of the present description.

DETAILED DESCRIPTION OF PREFERRED EMBODIMENTS

Figure 1:
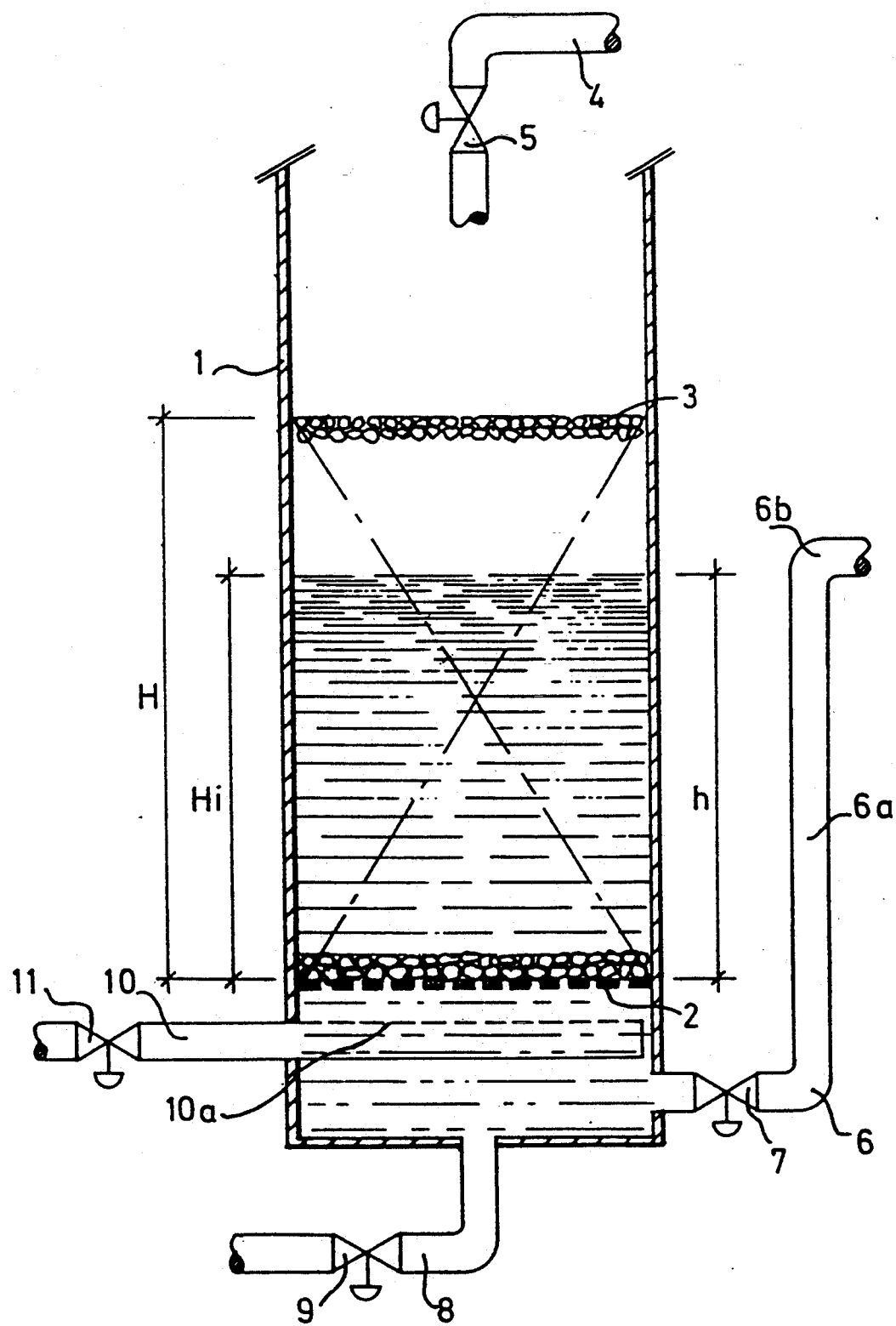
FIG. 1 is a schematic cross-sectional view along a vertical plane of a water treatment reactor according to the invention.

The reactor shown in FIG. 1 is intended for a biological purification of water.

It comprises, firstly, an enclosure 1 open in the upper portion, comprising an intermediate perforate platform 2. This enclosure 1 is partially filled to a height H by a bed of granular material 3 resting on the perforate platform 2, and constituting granular support materials of a volumic mass less than that of the water to be treated.

These support materials, of any known type, preferably have a volumic mass $\rho_{mat}$ such that $$0.7 \leq \frac{\rho_{mat}}{\rho_{eau}} < 1$$

$\rho$ being the volumic mass of the water to be treated, and a diameter on the order of several millimeters, for example comprising between two and six millimeters.

This reactor comprises, in addition, feed means 4 for the water to be treated, entering into the upper portion of the enclosure 1, and provided with closure means 5 such as an electrovalve. In a known manner, the feed means is constructed in order to obtain a homogeneous distribution of the water to be treated above the granular bed 3.

It also comprises an outlet conduit 6 for withdrawal of the treated water and provided with closure means 7 such as an electrovalve. This outlet conduit 6 empties from the bottom of the enclosure 1 beneath the perforate platform 2, extending by a rising conduit 6a provided with an upper reverse elbow 6b. This elbow 6b is situated at an intermediate height h above the platform 2, such that h<H, when the granular bed 3 rests on this platform.

This height h is adapted during a treatment cycle, in order that the granular bed 3 rests on the platform 2, that is, in order that the weight of this bed is greater that the corresponding Archimedes pressure, and in order that this granular bed have an immersed portion of a height Hi equal to h, and an emersed portion.

The reactor comprises in addition an evacuation conduit 8 emptying through the bottom wall of the enclosure 1, and is provided with closure means 9 such as an electrovalve.

It also comprises means for feeding treatment air and injection air comprised of pipes 10 extending below the platform 2 and provided with air outlets 10a arranged to deliver this air counter-current to the flow of water to be treated. This air feed means is provided with closure means 11, such as electrovalves.

Figure 2A:
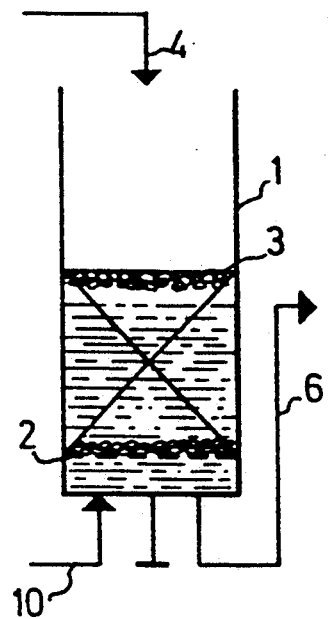
FIGS. 2a through 2f are schematic views illustrating the different steps of the washing of the reactor.

As is shown in FIG. 2a, during a treatment cycle, the granular bed 3 rests on the platform 2 and the water to be treated traverses this granular bed from top to bottom. Also, the treatment air is blown up from near the base of the enclosure 1.

The beginning of each washing cycle may be controlled, either as a function of turbidity or by means of a level sensor arranged in the enclosure in such a manner as to be activated upon a given increase of the level of water resulting from increased clogging of the bed.

Figure 2B:
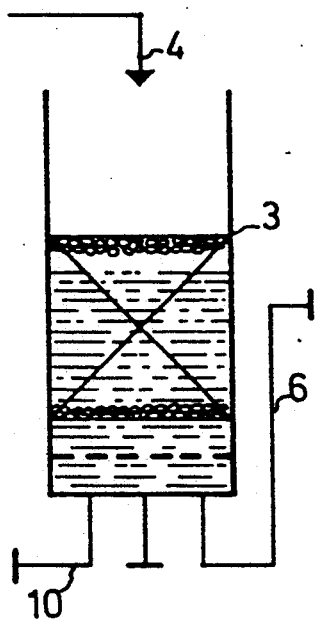

This washing cycle comprises firstly interrupting the withdrawal of treated water and the admission of treatment air. Because of this, the feed of water to be treated not being interrupted, the water level on the interior of the enclosure 1 rises, and the weight of the bed 3 becomes less than the Archimedes pressure. As a result, the granular bed is begins to float (FIG. 2b).

In a second period of time, the feed of water to be treated is interrupted when the volume of water VL in which the granular bed 3 floats reaches a value such that:

$$HL = \frac{H(1 - \epsilon')}{(1 - \epsilon')} \text{ with } \frac{\epsilon'}{\epsilon} \geq 1.2$$

where $\epsilon$ is the porosity of the granular bed at rest,

HL is the height of the water in the reactor above the platform, equivalent to the volume VL during agitation, $\epsilon'$ is the porosity of the granular bed when it is agitated.

Figure 2C:
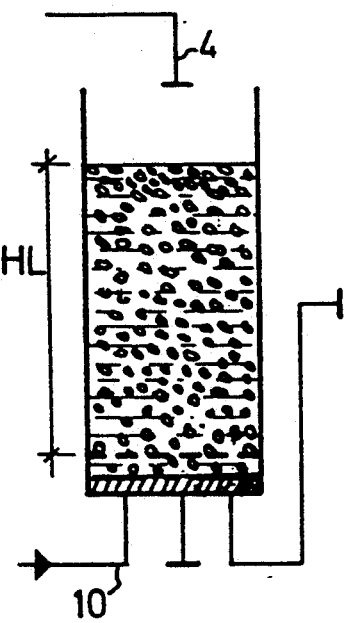

The cleaning air is then admitted to the enclosure in such a manner as to assure an effective cleaning of the granular bed 3 which causes a release of the sediment (FIG. 2C). During this agitation, a partial stratification appears between the sediment which occupies the lower portion, and the granular materials which preferentially remain in the upper part.

Figure 2D:
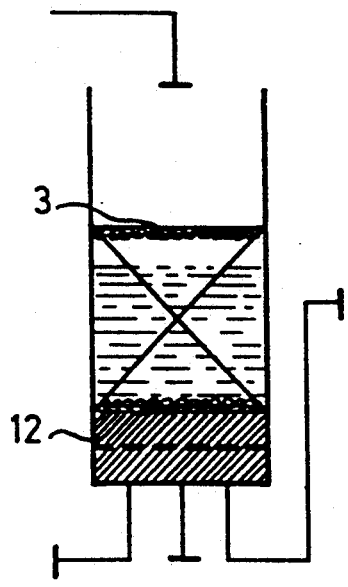

The stopping of the agitation by interrupting the admission of air then causes a very rapid separation of the granular materials 3 and the sediment 12 by the difference in volumic mass, with decantation of the sediment and flotation of these materials (FIG. 2d).

Figure 2E:
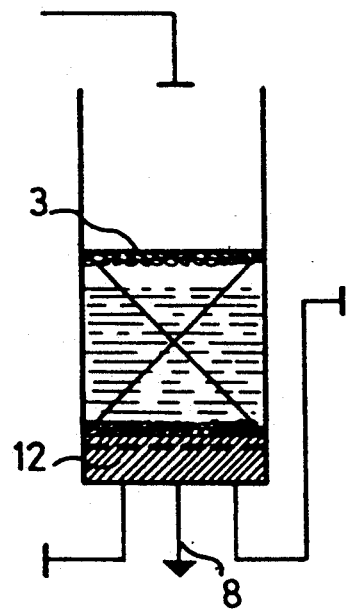
Figure 2F:
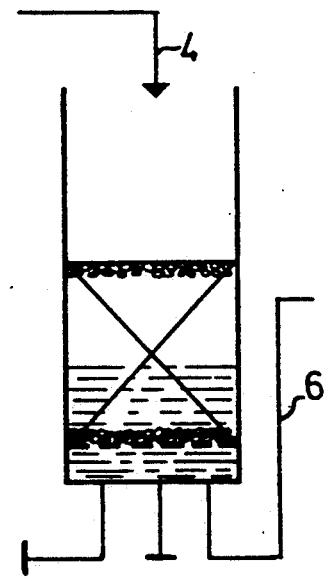

The liquid phase strongly enriched in sediment is then evacuated by a simple vacuum by opening the evacuation conduit 8 (FIG. 2e). Once the granular bed 3 is emptied and, as a result the washing cycle is terminated, the feed conduits 4, 6 for the feed of water to be treated and for withdrawal respectively are reopened for a new treatment cycle, and the level of water in the enclosure rises again to the level h (FIG. 2f). The treatment air is blown in anew at the bottom of the enclosure.

By way of illustration, an example of the operation of the process used for the treatment of urban waste water, is described hereinafter.

The characteristics of the crude water to be treated are as follows:

| | | |
|---|---|---|
| DCO total | 600–650 | mg $O_2$/l |
| DCO soluble | 200–300 | mg $O_2$/l |
| $DBO_5$ total | 200–250 | mg $O_2$/l |
| $DBO_5$ soluble | 80–120 | mg $O_2$/l |
| COT total | 100–150 | mg C/l |
| COT soluble | 70–90 | mg C/l |
| MES | 200–300 | mg MS/l |
| pH | 7.3 | |

This treatment was carried out in a reactor having the following characteristics: height of the granular bed 3 at rest on the platform 2: H=1.4 m;

height of the immersed bed: Hi=0.8 m;

materials: regenerated polyethylene, diameter 4–6 mm, density/water 0.94;

initial porosity of the bed $\epsilon$=0.52.

The treatment cycle was achieved under the following operative conditions:

filtration speed defined with respect to the empty barrel, 0.6 m/h;

time of passage defined with respect to the volume of the liquid 30 mn;

speed of the treatment air defined with respect to the empty barrel: 10 m/h;

applied volumic load defined with respect to the volume of the granular bed:

14.5 kg $DCO_t/m^3.j$ or 5.5 kg $DBO_t/m^3.j$ or 2.5 kg $COT_t/m^3.j$.

The duration of the treatment cycle was 100 hours, and the weight loss taken up at the end of the cycle of 50 cm of the column of water.

The washing cycle was carried out under the following conditions:

ratio of the height of the granular bed 3 to the platform 2 before the introduction of washing air: 1.8 m;

height of the water to the platform 2 after introduction of washing air: HL=2 m;

porosity $\epsilon'$ of the granular bed 3 during washing defined according to the relationship:

$$H_L = \frac{H(1-\epsilon)}{(1-\epsilon')} \text{ where } \epsilon' = 0.66$$

the speed of the washing air defined with respect to the empty barrel=60 m/h (duration 1 mn).

Such a process permits obtaining a treated effluent having the following characteristics:

| | | |
|---|---|---|
| DCO total | 90 mg $O_2$/l | yield 86% |
| DCO soluble | 70 mg $O_2$/l | yield 72% |
| COT total | 35 mg C/l | yield 72% |
| COT soluble | 30 mg C/l | yield 63% |
| MES | 20 to 30 mg MS/l | yield 90%. |

Purifying capacities: volumic weight eliminated, defined with respect to the volume of the granular bed: 10–12 kg $DCO_t/m^3.day$.

I claim:

1. A process for the treatment of water using a granular bed of granular materials (3) arranged in a reactor above a platform (2) in the reactor, the granular bed (3) being adapted to carry out a simple filtration treatment or filtration treatment in combination with an associated biological purification of water, said process comprising carrying out water treatment cycles through said granular bed (3) alternated with bed washing cycles, each treatment cycle being carried out while feeding the water to be treated from above the granular bed (3) and withdrawing the treated water from beneath the granular bed, said granular bed (3) comprising granular support materials having a volumic mass less than that of the water to be treated, each washing cycle comprising interrupting the withdrawal of treated water and stopping the feeding of treated water so that the granular bed (3) floats in a given volume of water VL, admitting washing air into the reactor for assuring an agitation of the floating bed, interrupting the admission of air for permitting a separation of the granular materials and the sediment (12) according to the difference in volumic mass, with settling of said sediment and flotation of said materials, evacuating the sediment from the bottom of the reactor with the water contained in the reactor thereby emptying the granular bed (3) for a new treatment cycle.

2. A water treatment process as in claim 1, and including during each treatment cycle, feeding the granular bed (3) from above and withdrawing treated water from below in such a manner that the granular bed rests on the platform (2), during each washing cycle:

interrupting the withdrawal of treated water, causing a rise in the level of water in the reactor in such a manner that the granular bed is caused to float in the volume of water VL, and stopping the feed of water to be treated.

3. A water treatment process as in claim 1, and wherein each treatment cycle is produced in such a manner that the granular bed (3) is immersed at a height Hi, and emersed in its upper portion, with:

$$\frac{H_i}{H} \leq \frac{\rho_{mat}}{\rho_{eau}}$$

where

H is the total height of the granular bed, $\rho_{mat}$ is the volumic mass of the support materials, $\rho_{eau}$ is the volumic mass of the water to be treated.

4. A water treatment process as in claim 1 and including interrupting the withdrawal of treated water and stopping the feed of water to be treated in such a manner that during a washing cycle, the granular bed (3) floats in the volume of water VL such that:

$$HL = \frac{H(1-\epsilon)}{(1-\epsilon')}$$

where

H is the total height of the granular bed at rest, $\epsilon$ is the porosity of the granular bed at rest, HL is the height of the water in the reactor above the platform, equivalent to the volume VL, during agitation, $\epsilon'$ is the porosity of the granular bed while being agitated.

5. A process as in claim 4, and wherein the bed is caused to float in the volume VL such that $$\frac{\epsilon'}{\epsilon} \geq 1.2$$

6. A water treatment process as in claim 1 and wherein the granular bed (3) used comprises granular support materials of a volumic mass $\rho_{mat}$ such that $$0.7 \leq \frac{\rho_{mat}}{\rho_{eau}} < 1$$

where $\rho_{eau}$ represents the volumic mass of the water to be treated.

7. A water treatment process as in claim 1, and including admitting treatment air during each treatment cycle, countercurrent to the flow of water to be treated.

8. A water treatment process as in claim 7, and including delivering the treatment air at the base of the reactor.

9. A water treatment process as in claim 7, and including delivering the treatment air above the platform (2) at an intermediate height above said platform less than the immersion height of the granular bed (3).

10. A process as in claim 1, and wherein the platform (2) is a perforated platform able to support granular materials and to permit the passage of sediment, said platform being arranged at an intermediate height of said reactor.

11. A water treatment process as in claim 1 and wherein said granular bed is comprised of at least two superimposed layers comprising different granular support materials, each of said materials having a volumic mass lower than that of the water to be treated.

12. A water treatment reactor and comprising in combination:
   an enclosure (1) having in its upper portion means (4) for feeding water to be treated, and comprising a platform (2) in its lower portion, and
   a porous bed (3) comprised of granular support materials having a volumic mass less than that of the water to be treated and effective to allow said bed to float, said bed partially filling the enclosure (1) along a height H,
   means (6) for withdrawing treated water from the bottom of the enclosure (1),
   closure means (7) for the withdrawing means (6),
   means (10) for feeding cleaning air for assuring an agitation of the granular bed (3),
   evacuation means (8) for evacuating mixed liquor comprised of sediment (12) in suspension in water resulting from the bed cleaning.

13. A water treatment reactor as in claim 12, and wherein said the withdrawal means (6) comprises a rising conduit (6a) provided with an evacuation outlet situated at an intermediate height h above the platform (2), with h<H when the bed (3) rests on the platform.

14. A water treatment reactor as in claim 12, and wherein said granular bed (3) comprises granular support material having a volumic mass ρ such that:

$$0.7 \leq \frac{\rho_{mat}}{\rho_{eau}} < 1$$

where $\rho_{eau}$ is the volumic mass of the water to be treated and $\rho_{mat}$ is the volumic mass of the support material.

15. A water treatment reactor as in claim 12, and including means for feeding treating air countercurrent to the flow of water to be treated.

16. A water treatment reactor as in claim 15, and wherein said treating air feed means discharges at the base of the enclosure (1).

17. A water treatment reactor as in claim 15, and wherein said treating air feed means discharges above the platform, at an intermediate height above said platform less than the immersion height of the granular bed when said bed rests on the platform.

18. A reactor as in claim 12, in which the platform (2) is a perforated platform able to support the granular materials and to permit the passage of sediment, said platform being arranged at an intermediate height in said reactor.

19. A water treatment reactor as in claim 12, and wherein said mixed liquor evacuation means (8) opens through the bottom of the enclosure.

20. A water treatment reactor as in claim 12, and wherein said granular bed (3) comprises at least two superimposed layers of different granular support materials of particles of different diameters each of said materials having:
   a volumic mass $\rho_{mat}$ such that
      with $\rho_{eau}$ representing the volumic mass of the water to be treated, and the
   diameters permitting layer restratification after bed cleaning.

* * * * *